(12) United States Patent
Yakovlev (10) Patent No.: US 8,041,742 B1
(45) Date of Patent: Oct. 18, 2011

(54) METHOD, SYSTEM, AND APPARATUS FOR PROVIDING GENERIC DATABASE SERVICES WITHIN AN EXTENSIBLE FIRMWARE INTERFACE ENVIRONMENT

(75) Inventor: Sergiy B. Yakovlev, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 143 days.

(21) Appl. No.: 11/018,495

(22) Filed: Dec. 20, 2004

(51) Int. Cl.
*G06F 7/00* (2006.01)
*G06F 17/30* (2006.01)
(52) U.S. Cl. .......... 707/793; 707/803
(58) Field of Classification Search .......... 707/3, 100, 707/793, 803, 999.001, 999.1; 713/170
See application file for complete search history.

(56) References Cited

U.S. PATENT DOCUMENTS

| | | | | |
|---|---|---|---|---|
| 6,721,751 | B1* | 4/2004 | Furusho | 707/100 |
| 7,421,431 | B2* | 9/2008 | Zimmer et al. | 1/1 |
| 2002/0062157 | A1* | 5/2002 | Sugimoto et al. | 700/14 |
| 2004/0123090 | A1* | 6/2004 | Zimmer et al. | 713/1 |
| 2004/0225865 | A1* | 11/2004 | Cox et al. | 712/34 |
| 2004/0268141 | A1* | 12/2004 | Zimmer et al. | 713/200 |
| 2005/0044207 | A1* | 2/2005 | Goss et al. | 709/224 |
| 2005/0044363 | A1* | 2/2005 | Zimmer et al. | 713/170 |
| 2006/0005002 | A1* | 1/2006 | Zimmer et al. | 713/1 |
| 2007/0033322 | A1* | 2/2007 | Zimmer et al. | 711/103 |

* cited by examiner

*Primary Examiner* — Yicun Wu
*Assistant Examiner* — Patrick Darno
(74) *Attorney, Agent, or Firm* — Hope Baldauff Hartman, LLC (57) ABSTRACT

Methods, systems, and computer-readable media are provided for providing generic database services within an EFI environment. A database engine is executed within an EFI environment that provides generic database functions on records having arbitrary data types. Database functions such as adding, deleting, and searching records may be performed by the database engine. The database engine utilizes a database structure for organizing the database that includes an initial count field for storing the initial number of records to be stored in the database, a record count field for storing the current number of records in the database, a key count field for storing the number of key fields in a stored data record, a key field for storing a pointer to a function for retrieving the value of a key field, and an index array field for storing a pointer to an index array. The index array is a sorted array of pointers to each of the data records in the database.

14 Claims, 8 Drawing Sheets

METHOD, SYSTEM, AND APPARATUS FOR PROVIDING GENERIC DATABASE SERVICES WITHIN AN EXTENSIBLE FIRMWARE INTERFACE ENVIRONMENT

BACKGROUND OF THE INVENTION

In most computing systems, low level instruction code is used as an intermediary between the hardware components of the computing system and the operating software and other high level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been proposed. The new specification is called the Extensible Firmware Interface ("EFI") specification and is available from INTEL CORPORATION.

The EFI specification describes an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

The EFI is capable of providing services to other applications. Services are implemented by modules that may be loaded by a boot loader when the EFI is started. The services may provide memory management, domain services, driver services, protocol services, and others. Each of these services may have a need to store and retrieve various types of data records. In the past, each service was responsible for implementing its own mechanism for storing and retrieving data, typically a circular doubly linked list. However, requiring each service to implement its own mechanism for storing and retrieving data results in a duplication of effort among the various services. Moreover, searching a linked list can often be a slow operation as compared to other types of searches. Accordingly, there is a need for a method, system, and apparatus that can provide generic database services that may be utilized by programs executing within an EFI environment to store records having arbitrary data types.

It is with respect to these considerations and others that the various embodiments of the invention have been made.

SUMMARY OF THE INVENTION

In accordance with the present invention, the above and other problems are solved by methods, systems, and computer-readable media for providing generic database services within an EFI environment. Through the use of a novel data structure, embodiments of the invention provide database functions to one or more services within an EFI environment for storing, searching, and retrieving database records. Because a generic database service is made available to the other services and programs executing within the EFI environment, the duplication of effort caused when each service implements its own database functions is eliminated. Moreover, as a result of the novel data structure utilized in the embodiments of the invention, searches may be performed on the database quicker than when utilizing circular doubly linked lists. Because the data structure is stored in volatile memory and does not require the use of a mass storage device, no input/output operations are performed.

According to one embodiment of the invention, a method is provided for offering generic database services within an EFI environment. The database services are generic because programs executing within the EFI environment may utilize the services to create a database with records having any arbitrary data type, and to add, remove, and search records within the database. This allows services and other programs executing within the EFI environment to store and search any type of data in a common manner. In order to provide this functionality, a database engine is executed within the EFI environment that is operative to provide database functions to one or more services for indexing and searching records having arbitrary data types. Database functions such as adding records, deleting records, and searching records may be performed by the database engine.

In order to provide such generic database services, the database engine utilizes a novel database structure for organizing the database. The database structure includes an initial count field for storing the initial number of records to be stored in the database, a record count field for storing the current number of records in the database, a key count field for storing the number of key fields in a stored data record, a key field for storing a pointer to a function for retrieving the value of a key field, and an index array field for storing a pointer to an index array. The index array is a sorted array of pointers to each of the data records in the database and is sorted based on one or more key fields for the data records.

In order to add records to the database, the index array is searched for an insertion point for a new record. The location of the new record is based in part on the key field specified for the index array. The contents of the index array are then adjusted to make room for the new record, and pointers are inserted into the index array pointing to the new record. Additionally, a determination may be made prior to inserting the record as to whether sufficient space exists within the index array for the new record. If sufficient space does not exist, the size of the index array may be increased.

In order to delete records from the database, a search may be made of the index array for the record to be deleted. If the record is located, the entry in the index array corresponding to the record to be deleted is removed. The contents of the index array may then be adjusted to account for the deleted record. In order to search the database for a record, the index array may be searched for an entry corresponding to the desired record and an indication may be returned as to whether the desired record was located. A binary search may be performed on the index array in order to improve performance.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide methods, systems, apparatuses, and computer-readable media for providing generic in-memory database services within an EFI environment. In the following detailed description, references are made to the accompanying drawings that form a part hereof, and in which are shown by way of illustration specific embodiments or examples. Referring now to the drawings, in which like numerals represent like elements throughout the several figures, aspects of the present invention and the exemplary operating environment will be described.

Figure 1:
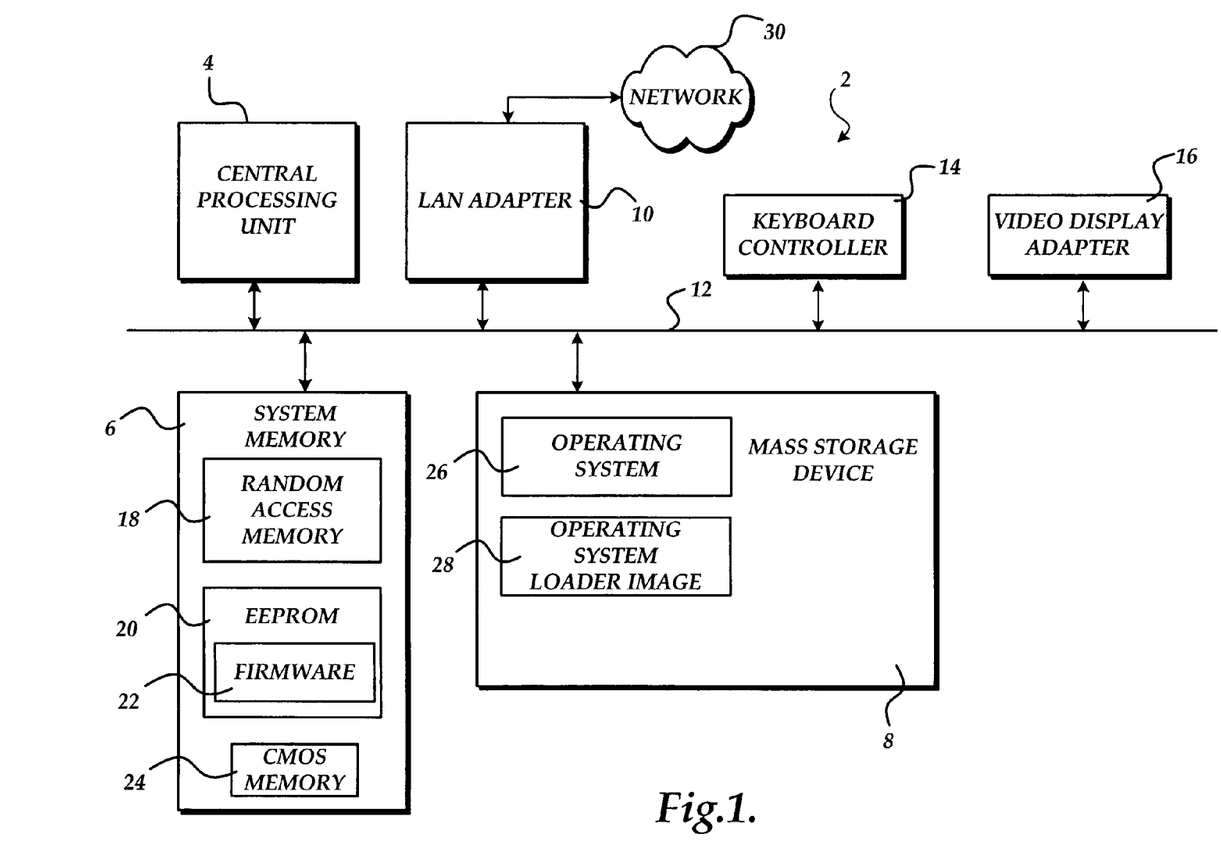
FIG. 1 is a computer architecture diagram that illustrates various components of a computer utilized in the embodiments of the invention.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer 2 utilized in the various embodiments of the invention will be described. The computer architecture shown in FIG. 1 illustrates a conventional computer, including a CPU 4, a system memory 6, including a RAM 18, an EEPROM 20, a CMOS memory 24, and a system bus 12 that couples the memory to the CPU 4. According to an embodiment of the invention, the CPU 4 may comprise a general purpose microprocessor from INTEL CORPORATION. For instance, the CPU 4 may comprise a PENTIUM 4 or XEON microprocessor from INTEL CORPORATION. It should be appreciated that any type of CPU may be utilized including INTEL-compatible devices from AMD, MIPS processors, POWERPC devices from IBM, or other types of RISC or CISC processors.

The EEPROM 20 may store a firmware 22 for use in operating the computer 2, such as a BIOS or an extensible firmware interface ("EFI"), containing the basic routines that perform basic platform initialization and prepare the computer 2 to launch an operating system. The CMOS memory 24 is a battery-backed memory device that may be used by the firmware 22 to store setting information for the computer 2. In the case of an EFI firmware, the EEPROM 20 may be utilized to store configuration information. Additional details regarding the architecture and operation of the firmware 22 will be provided below with respect to FIGS. 2 and 3.

The computer 2 further includes a mass storage device 8 for storing an operating system 26, an operating system loader image 28, application programs, and other program modules. The mass storage device 8 is connected to the CPU 4 through a mass storage controller (not shown) connected to the bus 12. The mass storage device 8 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 30, such as the Internet. The computer 2 may connect to the network 30 through a local area network ("LAN") adapter 10 connected to the bus 12. It should be appreciated that the LAN adapter 10 may also be utilized to connect to other types of networks and remote computer systems. The computer 2 may also include a keyboard controller 14 for receiving input from a keyboard and a video display adapter 16 for providing output to a display screen.

Figure 2:
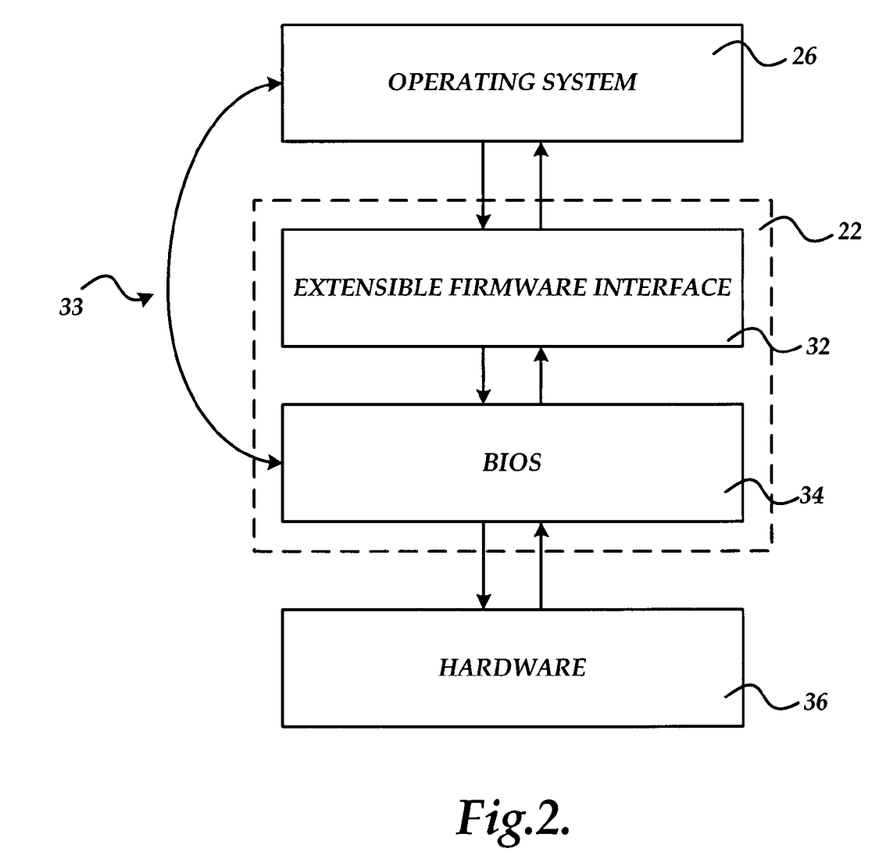
FIGS. 2 and 3 are computer architecture diagrams that illustrate aspects of an extensible firmware interface environment utilized by the embodiments of the invention.

Referring now to FIG. 2, additional details regarding the operation of the firmware 22 of the computer 2 will be described. According to embodiments of the invention, the firmware 22 may comprise a computer basic input output system ("BIOS"). As known to those skilled in the art, the BIOS of a PC-compatible computer provides an interface between the operating system 26 and the hardware 36 of the computer 2. Alternatively, the firmware 22 may comprise a firmware compatible with the EFI specification ver. 1.1 from INTEL CORPORATION.

The EFI specification describes an interface between the operating system 26 and the system firmware 22. The EFI specification defines the interface that platform firmware must implement, and the interface that the operating system 26 may use in booting. How the firmware 22 implements the interface is left up to the manufacturer of the firmware. The intent of the specification is to define a way for the operating system 26 and firmware 22 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 32 and a BIOS 342 may be presented in the firmware 22. This allows users and system integrators to support both firmware interfaces. In order to provide this functionality, an interface 33 may be provided for use by legacy operating systems and applications. Additional details regarding the architecture and operation of the EFI 32 are provided below with respect to FIG. 3. Moreover, additional details regarding the operation and architecture of EFI can be found in the EFI specification which is available from INTEL CORPORATION end expressly incorporated herein by reference.

Figure 3:
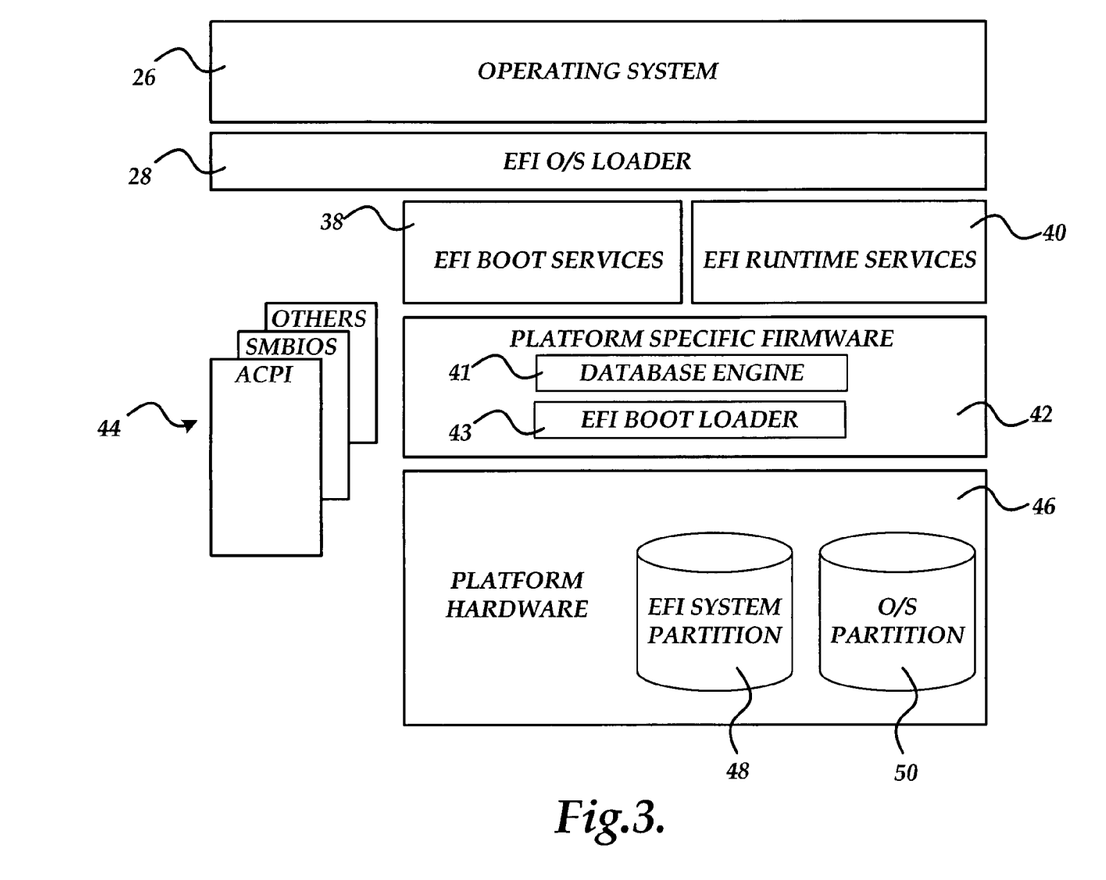

Turning now to FIG. 3, additional details regarding an EFI specification-compliant system utilized to provide an operating environment for the various embodiments of the invention will be described. As shown in FIG. 3, the system includes platform hardware 46 and an operating system 26. The platform firmware 42 may retrieve an OS image from the EFI system partition 48 using an EFI O/S loader 28. The EFI system partition 48 may be an architecturally shareable system partition. As such, the EFI system partition 48 defines a partition and file system that are designed to allow safe sharing of mass storage between multiple vendors. An O/S partition 50 may also be utilized.

Once started, the EFI O/S loader 28 continues to boot the complete operating system 26. In doing so, the EFI O/S loader 28 may use EFI boot services 38 and interface to other supported specifications to survey, comprehend, and initialize the various platform components and the operating system software that manages them. Thus, interfaces 44 from other specifications may also be present on the system. For example, the Advanced Configuration and Power Management Interface ("ACPI") and the System Management BIOS ("SMBIOS") specifications may be supported.

EFI boot services 38 provides interfaces for devices and system functionality that can be used during boot time. EFI runtime services 40 may also be available to the EFI O/S loader 28 during the boot phase. For example, a minimal set of runtime services may be presented to ensure appropriate abstraction of base platform hardware resources that may be needed by the operating system 26 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 43 at system boot time. The EFI boot loader 43 is a component in the EFI firmware that determines which program modules should be explicitly loaded and when. Once the EFI firmware is initialized, it passes control to the boot loader 43. The boot loader 43 is then responsible for determining which of the program modules to load and in what order.

The various program modules executing within the EFI may have a need to store data in an easy to access and manage manner. Because the various program modules may utilize data of virtually any data type, there is also a need to store data of any arbitrary data type. The database engine 41 executes within the EFI and provides these services to other program modules executing within the EFI. The database engine 41 may be provided as a part of the EFI core or as a separate EFI driver. In particular, program modules executing within the EFI can utilize the database engine 41 to index stored data in a database. Records can be added to the database, removed from the database, and the database may be searched. Other types of database functions may also be performed on the records stored by the database engine 41. Additional details regarding the operation of the database engine 41 will be provided below with respect to FIGS. 4-9.

Figure 4:
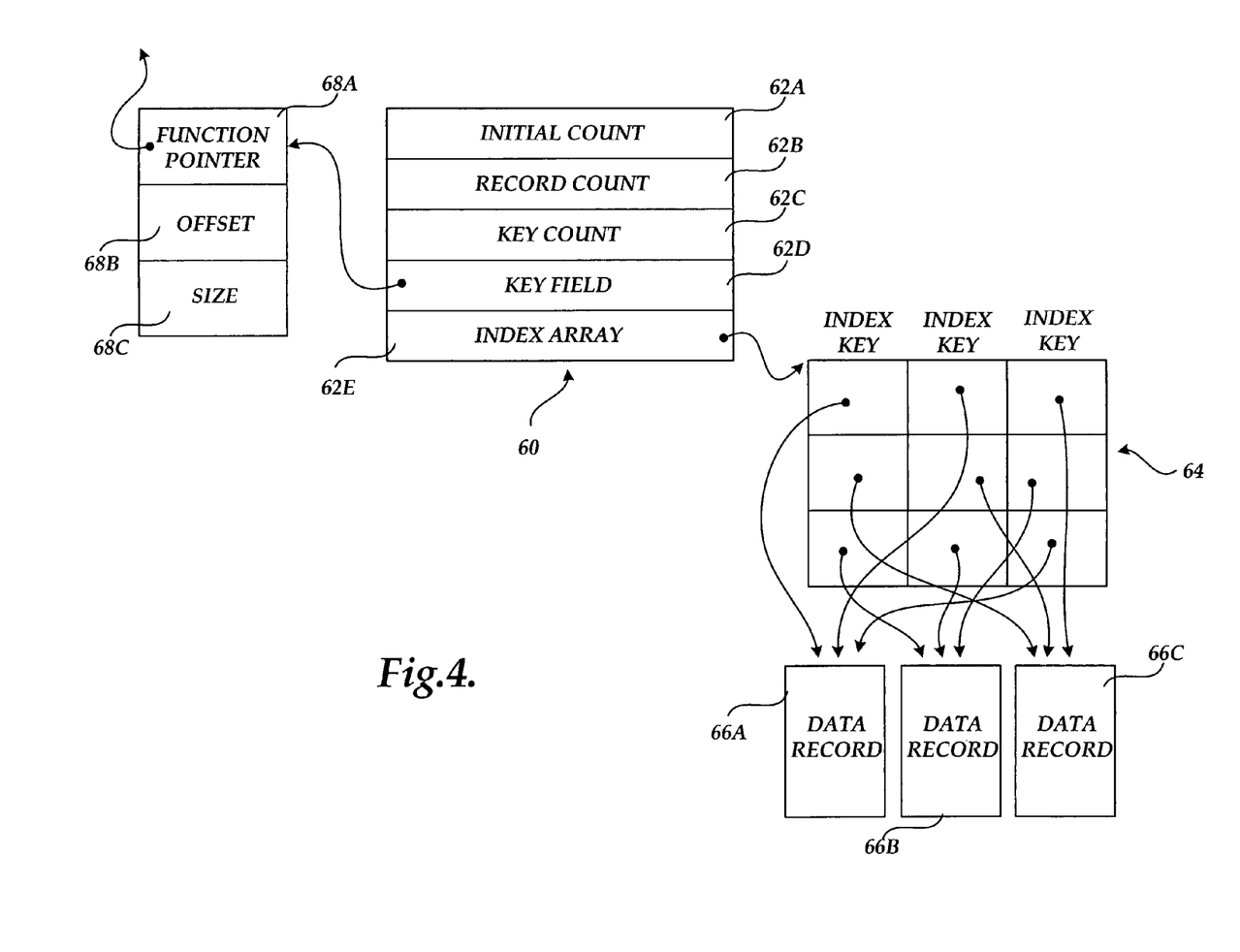
FIG. 4 is a data structure diagram that illustrates aspects of a data structure utilized to provide a generic database in the various embodiments of the invention.

Referring now to FIG. 4, details regarding several data structures utilized in the various embodiments will be provided. In particular, the database engine 41 utilizes a database structure 60 to store data regarding the contents of the database. The database structure includes an initial count field 62A that stores data indicating the initial number of records to be stored in the database. The contents of the initial count field 62A may be utilized by the database engine 41 to initially allocate memory space for an index array 64 that stores pointers to the actual data records. Additional details regarding the contents and use of the index array 64 will be provided below.

The database structure 60 also includes a record count field 62B for storing data indicating the current number of records in the database. The record count field 62B is utilized to determine whether additional space should be added to the index array 64. As will be described in detail below, the index array 64 may be enlarged if the contents of the record count field 62B is equal to the contents of the index array 64 minus one. The database structure 60 also stores a key count field 62C for storing data identifying the number of key fields in a stored data record. Key fields are data fields within stored records that may be utilized to sort the contents of the index array 64 and determine size of the index array 64.

The database structure 60 also includes a key field 62D for storing a pointer to a data field 68A that includes a pointer to a function for retrieving and comparing the value of a key field. The function provides the direction to the index key. If the function returns zero, the index is found. If the function returns a non-zero number, the sign of the returned number indicates the direction of the index key. Along with the data field 68A, data fields 68B-68C store an offset and a size of the key field, respectively. By knowing the offset into a data record where the index key is located and the size of the key, the database engine 41 may perform index operations on the various data records 66A-66C without understanding the data type of the records. In this manner, the database engine 41 can index arbitrary data types utilized by program modules executing within the EFI environment.

The database structure 60 also includes an index array field 62E for storing a pointer to an index array 64. The index array 64 comprises a sorted array of pointers to each of the data records 66A-66B in the database. In particular, the index array is sorted based on one or more key fields for the data records 66A-66B. For instance, as shown in FIG. 4, the index array 64 includes columns corresponding to each of three index keys that have been defined for the data records 66A-66C. Accordingly, the value of the key count field 62C in this case would be three. The index array 64 has three rows corresponding to the three records 66A-66C. Accordingly, the value of the record count field 62B would also be three. Example pointers shown in FIG. 4 illustrate the contents of the index array 64. Each of the columns of the index array 64 are sorted based on the contents of the index field within the data records 66A-66C for the particular index key. Additional details regarding this process are described below with reference to FIGS. 5A-5D.

Figure 5A:
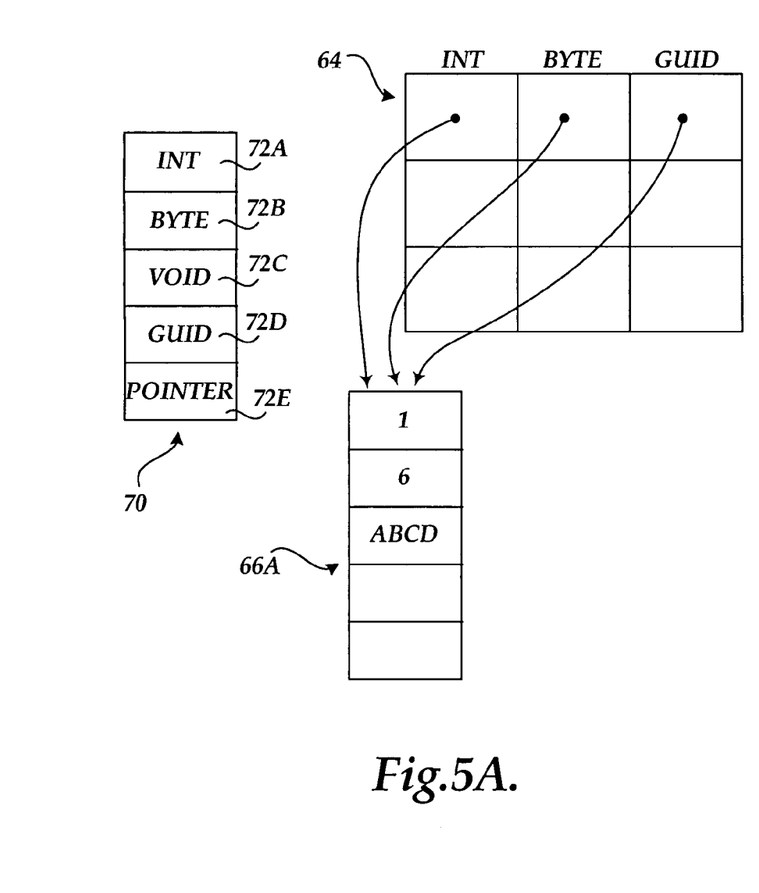
FIGS. 5A-5D are data structure diagrams illustrating aspects of the processes for adding and removing records from a database utilizing the various embodiments of the invention.

Turning now to FIGS. 5A-5D, the process of adding and deleting records will be described in the context of an illustrative data record 70. As shown in FIG. 5A, the data record 70 includes five fields, including an integer field 72A, a byte field 72B, a void field 72C, a globally unique identifier ("GUID") field 72D, and a pointer field 72E. In the example shown in FIGS. 5A-5D, the integer field 72A, byte field 72B, and GUID field 72D have been identified as key fields. Accordingly, the index array 64 includes three columns, one corresponding to each of the key fields, respectively.

When a record, such as the record 66A, is added to the database, pointers are inserted into the index array 64 corresponding to the added record. The pointers are added for each of the key fields and are added in sorted order according to the value of the key field in the added record. Because the record 66A is the first record added to the database, each of the pointers in the first row point to the record 66A. Details regarding the addition of subsequent records are provided below.

Figure 5B:
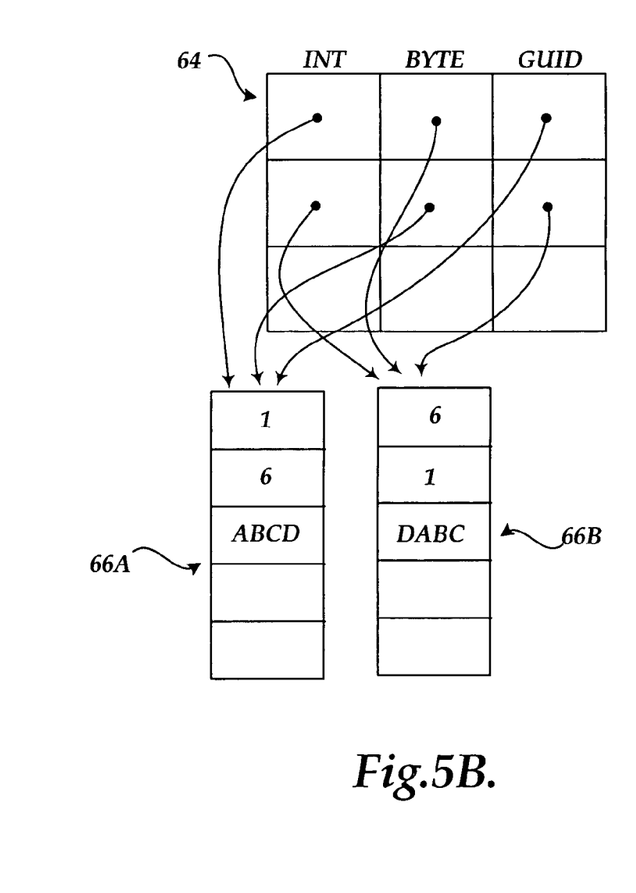

FIG. 5B illustrates the process of adding a second record 66B to the database. When the second record 66B is added, pointers to the new record are added to the index array 64 in a sorted order. For instance, because the value of the integer field 72A in the record 66A is less than the value of the same field in the record 66B, the pointer to the record 66B is added to the first column of the index array 64 after the pointer to the record 66A. Because the value of the byte field 72B in the record 66A is more than the value of the same field in the record 66B, the pointer to the record 66B is added to the second column of the index array 64 before the pointer to the record 66A. Likewise, because the value of the GUID field 72D in the record 66A is less than the value of the same field in the record 66B, the pointer to the record 66B is added to the third column of the index array 64 after the pointer to the record 66A.

Figure 5C:
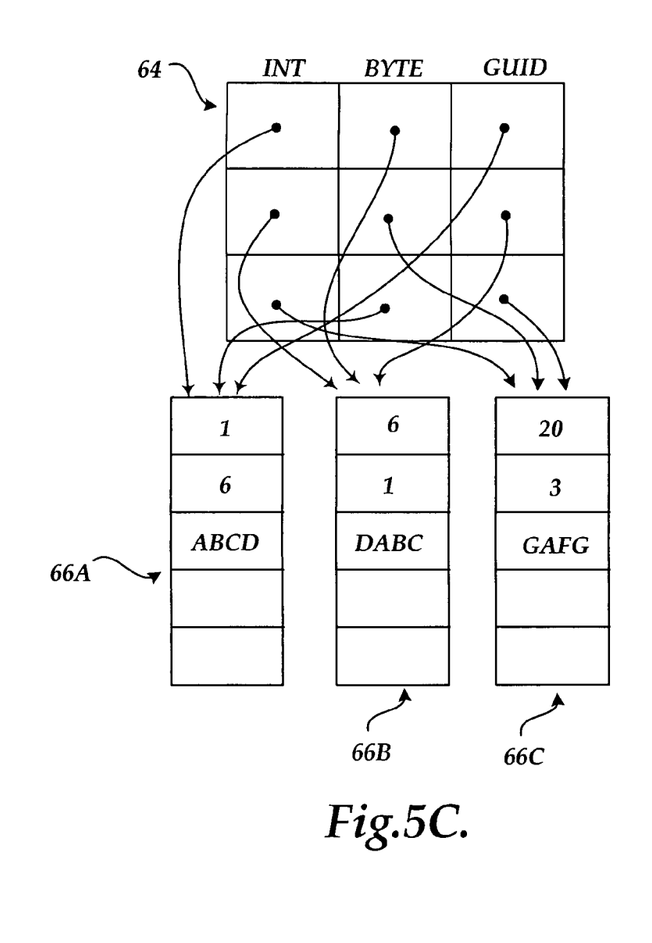

FIG. 5C illustrates the process of adding a third record 66C to the database. When the third record 66C is added, pointers to the new record are added to the index array 64 in sorted order based on the value of the key fields within the record 66C. For instance, because the value of the integer field 72A in the record 66C is less than the value of the same field in the records 66A and 66B, a pointer to the record 66C is added to the first column of the index array 64 after the pointers to the records 66A and 66B. Because the value of the byte field 72B in the record 66C is greater than the value of the corresponding field in the record 66B but less than the value of the field in the record 66A, a pointer to the record 66C is placed after the pointer to the record 66B and before the pointer to the record 66A in the second column of the index array 64. Similarly, because the value of the GUID field 72D in the record 66C is less than the value of the corresponding field in both the records 66A and 66B, a pointer to the record 66C is placed after the pointers to the records 66A and 66B in the third column of the index array 64.

Figure 5D:
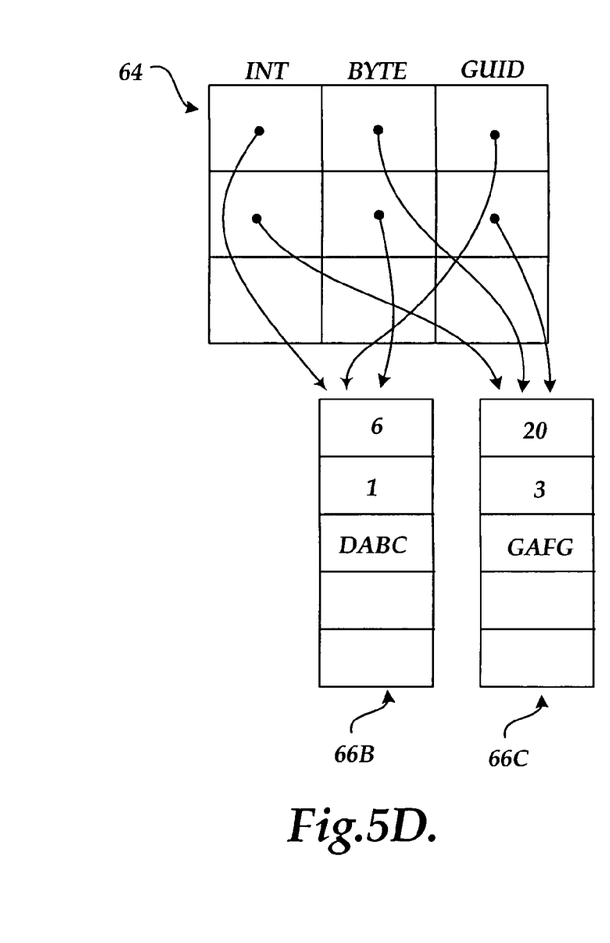

FIG. 5D illustrates the process of deleting a record from the database. In particular, in FIG. 5D, the record 66A has been deleted. In order to delete a record, a search is made of the index table for the pointers to the record 66A and the pointers are removed. The pointers to the other records in the database are then adjusted to account for the removal of the pointers to the deleted record. For instance, as shown in FIG. 5D, the pointers have been arranged so that the pointers point to the records 66B and 66C based on the values of the index keys for each of the columns of the index array 64. It should be appreciated that other records may be added and deleted in a manner similar to that described herein.

Figure 6:
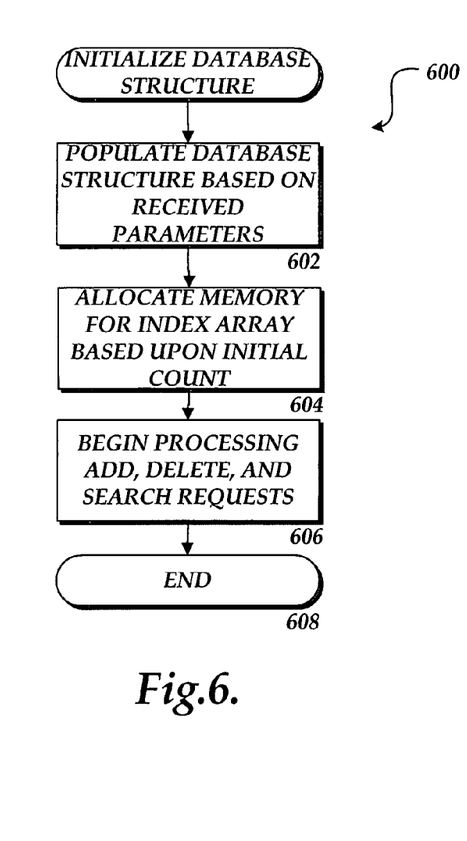
FIGS. 6-9 are flow diagrams illustrating several processes provided by the various embodiments of the present invention.

Referring now to FIG. 6, an illustrative routine 600 will be described in detail for initializing the data structure utilized in providing generic database services. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 600 begins at operation 602, where the fields 62A-62E of the database structure 60 are populated with data received from the program module that requests the creation of a new database. For instance, the program module will provide as parameters the initial count, key count, and key field values. These values are then inserted into the database structure 60. From operation 602, the routine 600 continues to operation 604.

At operation 604, memory is allocated for the index array 64. Memory is allocated based on the value passed for the initial count field 62A and the key count field 62C. In this manner, memory is allocated for an initial size of the index array 64 based on the initial number of records multiplied by the number of keys. From operation 604, the routine 600 continues to operation 606.

At operation 606, the database engine 41 begins processing requests from program modules to add records to the database, to search the database for records, and to delete records from the database. Methods for adding records, deleting records, and searching for records in the database will be described below with respect to FIGS. 7, 8, and 9, respectively. From operation 606, the routine 600 continues to operation 608, where it ends.

Figure 7:
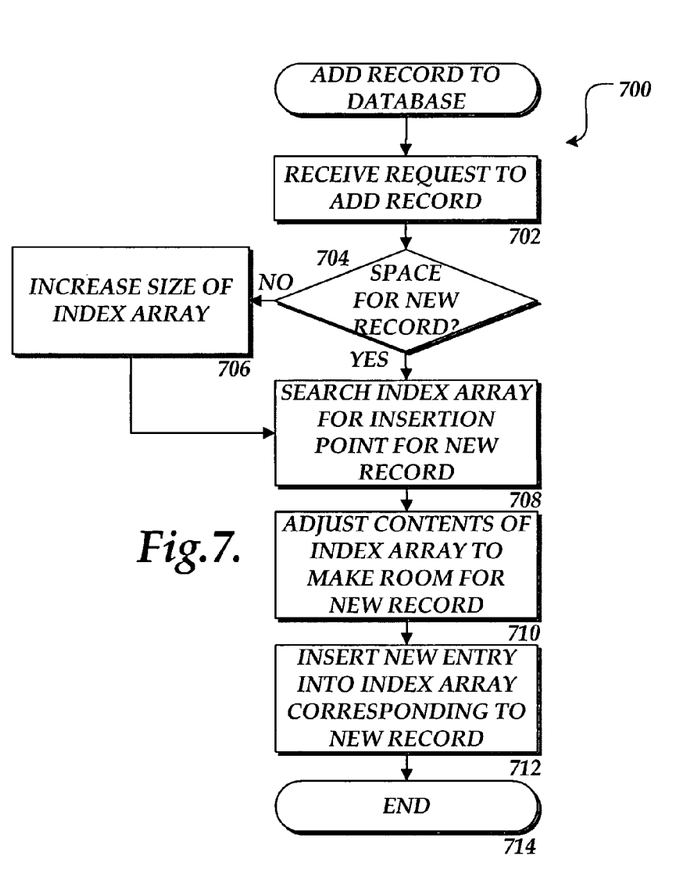

Turning now to FIG. 7, an illustrative routine 700 will be described for adding a record to a database. The routine 700 begins at operation 702, where a request to add a record to an existing database is received by the database engine 41. Memory for storing the actual record will have already been allocated by the calling program. However, a determination must be made as to whether the index array 64 includes sufficient memory space for the pointers to the new record. If space does not exist, the routine 700 branches to operation 706, where the size of the index array 64 is increased. According to one embodiment, a new memory area may be allocated that is two times the current size of the index array 64. The current contents of the index array 64 may then be copied into the new memory area. The pointer contained in the index array field 62E may then be adjusted to point to the new memory area. Memory that was occupied by old index array will be freed. Other methods for increasing the size of the index array 64 may also be utilized. From operation 706, the routine 700 continues to operation 708.

If, at operation 704, it is determined that sufficient memory exists for the pointers to the new record, the routine 700 continues to operation 708. At operation 708, a search is made of the index array 64 to determine the insertion point within the index array 64 for the new record. The search is performed for each key value. A binary search is utilized in one embodiment of the invention, but other types of search algorithms may also be utilized.

Once the insertion point for the new record has been identified, the routine 700 continues to operation 710, where the contents of the index array 64 are adjusted to make space for the insertion of the pointer to the new record in the sorted location. There is no need to adjust the contents of the index array 64 if the new record is added behind the existing records. From operation 710, the routine 700 continues to operation 712, where a new pointer is inserted into the index array pointing to the new record. The Record Count field 62B will be incremented to reflect correct number of records. The routine 700 then continues to operation 714, where it ends.

Figure 8:
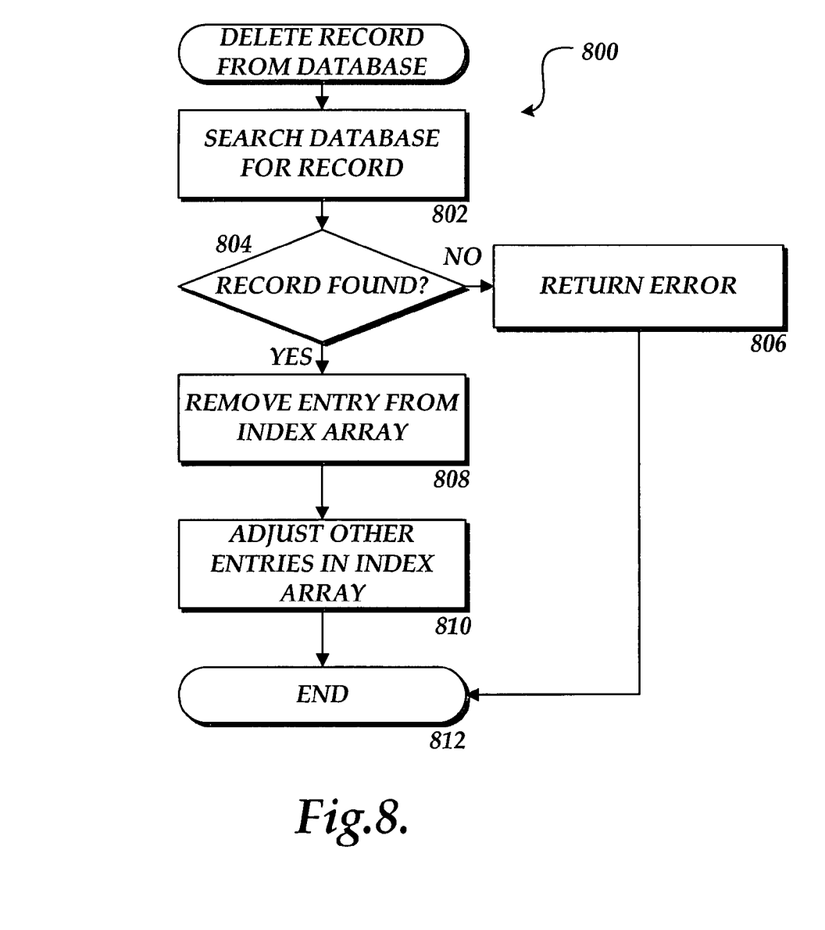

Referring now to FIG. 8, an illustrative routine 800 will be described for deleting a record from the database. The routine 800 begins at operation 802, where a search is made of the database for the record to be deleted. A binary search may be utilized or other type of search algorithm known to those skilled in the art. From operation 802, the routine 800 continues to operation 804, where a determination is made as to whether a matching record was identified. If a matching record was not located, the routine 800 branches to operation 806, where an error is returned to the calling program module. From operation 806, the routine 800 continues to operation 812, where it ends.

If, at operation 804, a matching record was located, the routine 800 continues to operation 808, where the entry in the index array 64 is removed for the located record. The routine 800 then continues to operation 810, where the remaining entries in the index array 64 are adjusted to account for the removed pointers. Then Record Count field 62B decrements to reflect correct number of records. The routine 800 then continues to operation 812, where it ends.

Figure 9:
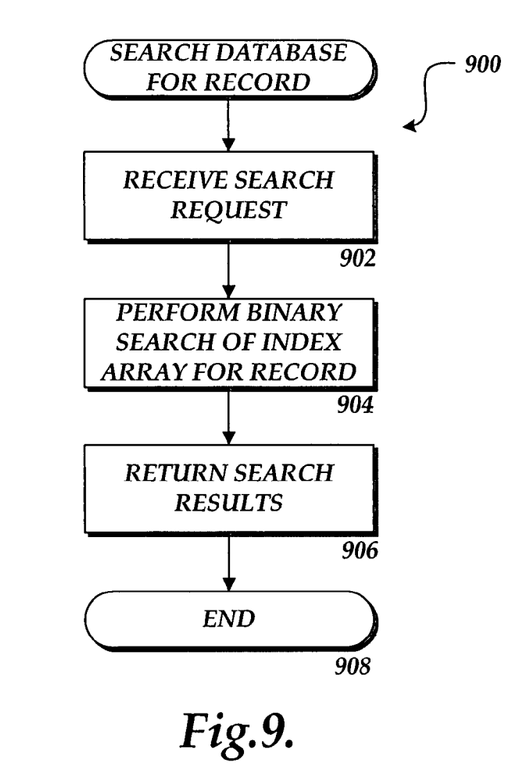

Turning now to FIG. 9, an illustrative routine 900 will be described for searching the database for a record. The routine 900 begins at operation 902, where a search request is received. The routine 900 then continues to operation 904, where a binary search is performed of the index array 64 to locate the desired record. Other types of search algorithms may also be utilized. The routine 900 then continues to operation 906, where the search results are returned to the calling program module. The routine 900 then continues to operation 908, where it ends.

It should be appreciated that embodiments of the present invention provide methods, systems, apparatuses, and computer-readable media for providing generic in-memory database services within an EFI environment. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A computer-implemented method for providing generic database services within an extensible firmware interface environment, the method comprising computer-implemented operations for:

loading one or more programs at computer boot time within the extensible firmware interface environment, the programs configured to provide boot and runtime services for a computer, the extensible firmware interface environment providing an interface between an operating system and system firmware;

providing, during the boot time, database functions via the generic database services to the programs by executing a database engine within the extensible firmware interface environment, the database functions configured to index and search records having arbitrary data types, the programs configured to create a database with records having the arbitrary data types through the database functions;

wherein the database engine is configured to utilize a database structure to store data regarding content of the database, the database structure comprising an initial count field for storing data indicating an initial number of records to be stored in the database, a record count field for storing data indicating a current number of records stored in the database, a key count field for storing data indicating a number of key fields in a stored data record, a key field for storing a pointer to a data field that includes a pointer to a particular database function of the database functions for providing a direction to an index key, and an index array field for storing a pointer to an index array, the index array comprising a number of columns equal to the number of key fields and a number of rows equal to the current number of records in the database;

determining the initial number of records to be stored in the database based on the initial count field;

allocating memory space for the index array according to the initial number of records;

determining whether the record count field is equal to contents of the index array minus one;

upon determining that the record count field is equal to the contents of the index array minus one, enlarging the index array;

sorting the contents of the index array based on the key fields in the stored data record;

determining a size of the index array based on the key fields in the stored data record; and determining the direction of the index key based on the particular database function.

2. The computer-implemented method of claim 1, wherein the database functions further comprise database functions for adding the records, deleting the records, and searching the records.

3. The computer-implemented method of claim 2, wherein the index array comprises a sorted array of pointers to each of the data records in the database, the index array being sorted based on one or more key fields for the data records.

4. The computer-implemented method of claim 3, wherein adding the records comprises searching the index array for an insertion point for a new record, adjusting the contents of the index array to make room for the new record, and inserting pointers into the index array pointing to the new record.

5. The computer-implemented method of claim 4, wherein adding the records further comprises determining whether sufficient space exists within the index array for the new record, and increasing the size of the index array if space does not exist.

6. The computer-implemented method of claim 3, wherein deleting the records comprises searching the index array for a record to be deleted, removing an entry in the index array corresponding to the record to be deleted, and adjusting the contents of the index array for the deleted record.

7. The computer-implemented method of claim 6, wherein searching the records comprises searching the index array for an entry corresponding to a desired record and returning an indication of whether the desired record was located.

8. A non-transitory computer-readable storage medium having computer-executable instructions stored thereon which, when executed by a computer, cause the computer to:
load one or more programs at computer boot time within an extensible firmware interface environment, the programs configured to provide boot and runtime services for the computer, the extensible firmware interface environment providing an interface between an operating system and system firmware of the computer;
provide, during the boot time, database functions via the generic database services to the programs by executing a database engine within the extensible firmware interface environment, the database functions configured to index and search records having arbitrary data types, the programs configured to create a database with records having the arbitrary data types through the database functions;
wherein the database engine is configured to utilize a database structure to store data regarding content of the database, the database structure comprising an initial count field for storing data indicating an initial number of records to be stored in the database, a record count field for storing data indicating a current number of records stored in the database, a key count field for storing data indicating a number of key fields in a stored data record, a key field for storing a pointer to a data field that includes a pointer to a particular database function of the database functions for providing a direction to an index key, and an index array field for storing a pointer to an index array, the index array comprising a number of columns equal to the number of key fields and a number of rows equal to the current number of records in the database;
determine the initial number of records to be stored in the database based on the initial count field;
allocate memory space for the index array according to the initial number of records;
determine whether the record count field is equal to contents of the index array minus one;
upon determining that the record count field is equal to the contents of the index array minus one, enlarge the index array;
sort the contents of the index array based on the key fields in the stored data record;
determine a size of the index array based on the key fields in the stored data record; and
determine the direction of the index key based on the particular database function.

9. The non-transitory computer-readable storage medium of claim 8, wherein the database functions further comprise database functions for adding the records, deleting the records, and searching the records.

10. The non-transitory computer-readable storage medium of claim 9, wherein the index array comprises a sorted array of pointers to each of the data records in the database, the index array being sorted based on one or more key fields for the data records.

11. The non-transitory computer-readable storage medium of claim 10, wherein adding the records comprises searching the index array for an insertion point for a new record, adjusting the contents of the index array to make room for the new record, and inserting pointers into the index array pointing to the new record.

12. The non-transitory computer-readable storage medium of claim 11, wherein adding the records further comprises determining whether sufficient space exists within the index array for the new record, and increasing the size of the index array if space does not exist.

13. The non-transitory computer-readable storage medium of claim 10, wherein deleting the records comprises searching the index array for a record to be deleted, removing an entry in the index array corresponding to the record to be deleted, and adjusting the contents of the index array for the deleted record.

14. The non-transitory computer-readable storage medium of claim 13, wherein searching the records comprises searching the index array for an entry corresponding to a desired record and returning an indication of whether the desired record was located.

* * * * *